M. J. ROBINSON.
TRANSMISSION GEAR.
APPLICATION FILED JAN. 6, 1908.
907,289.
Patented Dec. 22, 1908.
3 SHEETS—SHEET 3.
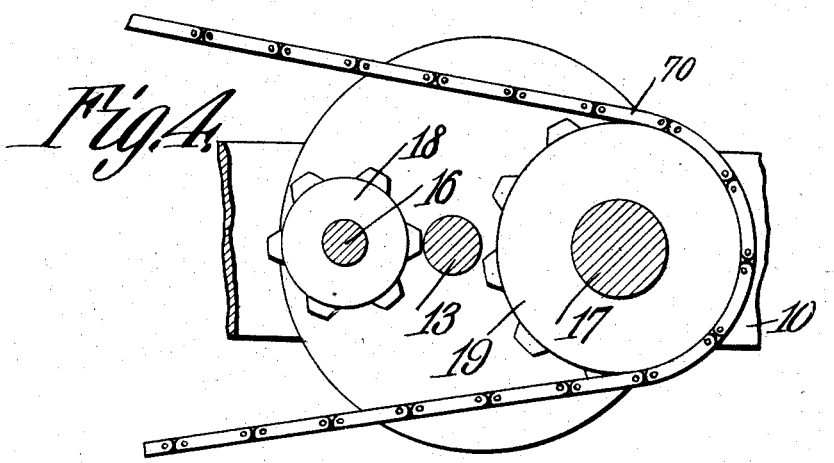
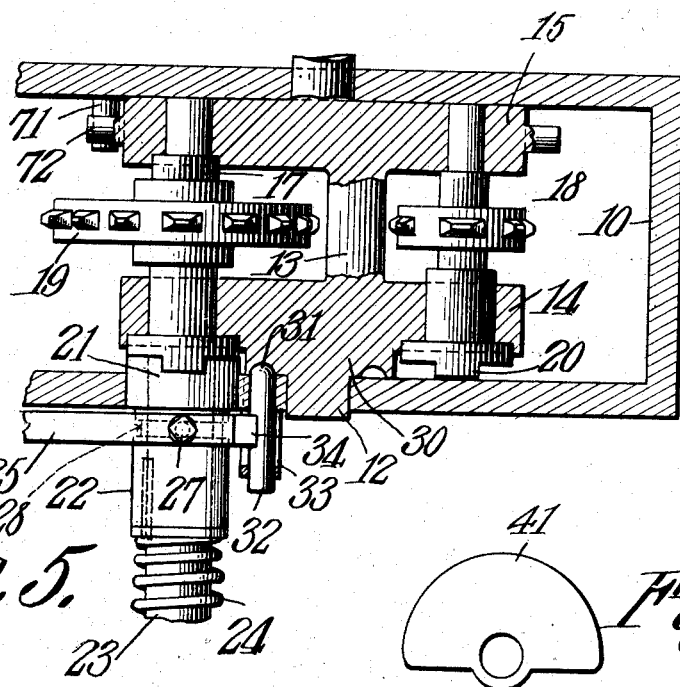
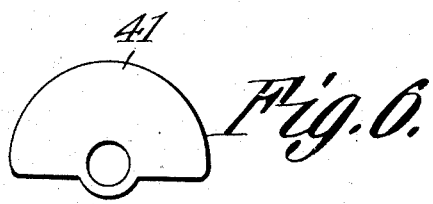
Witnesses
Inventor
Major J. Robinson.
By
Attorneys

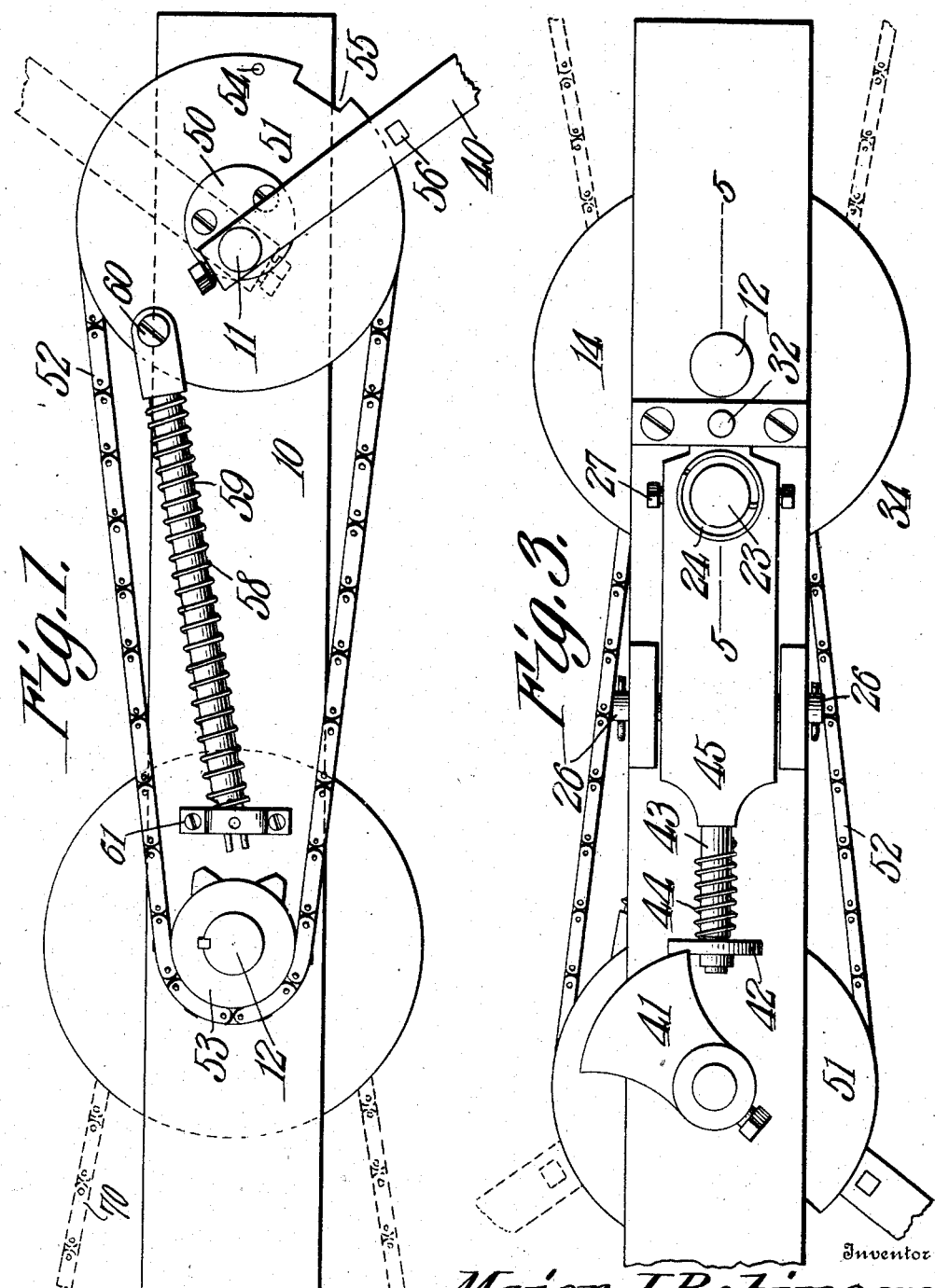

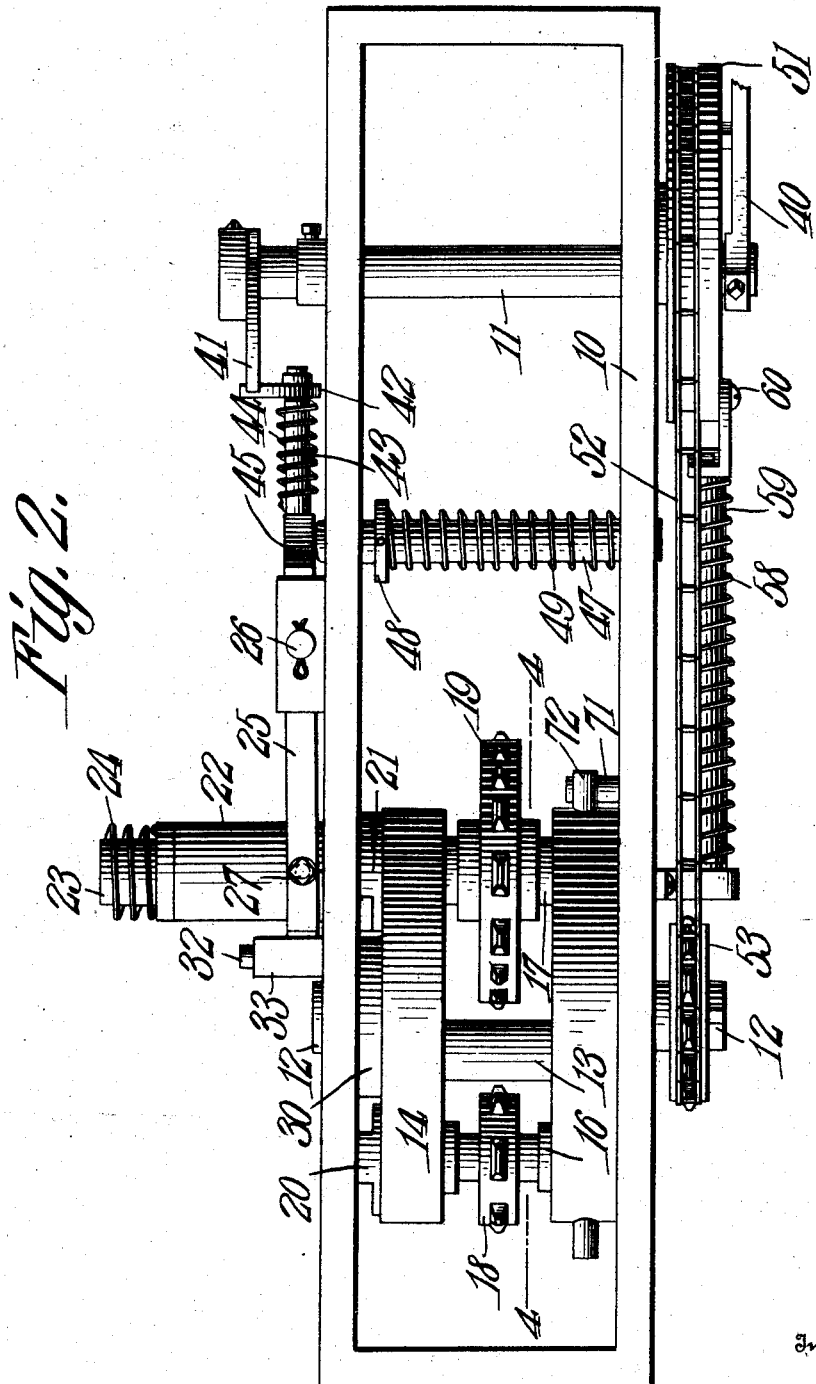

UNITED STATES PATENT OFFICE.

MAJOR J. ROBINSON, OF LONGBEACH, CALIFORNIA.

TRANSMISSION-GEAR.

No. 907,289.     Specification of Letters Patent.     Patented Dec. 22, 1908.

Application filed January 6, 1908. Serial No. 409,481.

*To all whom it may concern:*

Be it known that I, MAJOR J. ROBINSON, a citizen of the United States, residing at Longbeach, in the county of Los Angeles and State of California, have invented a new and useful Transmission-Gear, of which the following is a specification.

This invention relates to transmission gearing, and has for its principal object to provide a transmission gear in which direct drive may be secured at different speeds, and which is practically noiseless, and at the same time is of light and economical construction, while the loss of power through friction is reduced to the minimum.

A further object of the invention is to provide a transmission gear in which the change in speed may be made very quickly and by a single movement of an operating lever or similar device, thus avoiding the necessity of operating a number of clutch levers or similar connecting devices to secure the desired result.

A still further object of the invention is to provide a novel form of sprocket chain drive in which provision is made for changing the driving sprocket so that a sprocket wheel of larger or smaller diameter may be moved into engagement with the chain for the purpose of altering the speed at which the latter is driven.

With these and other objects in view, as will more fully hereinafter appear, the invention consists in certain novel features of construction and arrangement of parts, hereinafter fully described, illustrated in the accompanying drawings, and particularly pointed out in the appended claims, it being understood that various changes in the form, proportions, size and minor details of the structure may be made without departing from the spirit or sacrificing any of the advantages of the invention.

In the accompanying drawings:—Figure 1 is a side elevation of a transmission gearing constructed in accordance with the invention. Fig. 2 is a plan view of the same. Fig. 3 is an elevation looking from the side opposite that shown in Fig. 1. Fig. 4 is a vertical section illustrating the arrangement of the large and small sprocket wheels. Fig. 5 is a sectional plan view of a portion of the mechanism. Fig. 6 is a detail view of the clutch operating cam.

Similar numerals of reference are employed to indicate corresponding parts throughout the several figures of the drawings.

The transmission gear is carried in a frame 10, that is provided with bearings near one end for a shaft 11, and near the opposite end with bearings for the opposite ends of a crank shaft 12, carrying an intermediate pin 13, and a pair of spaced disks 14 and 15, the shaft, pin and disks being rigidly secured together.

The disks are provided with bearings for the support of two shafts 16 and 17, the shaft 16 carrying a small sprocket wheel 18 and the shaft 17 carrying a large sprocket wheel 19. Each of the shafts extends through and beyond the outer face of the disk 14, and is provided with clutching teeth, the shaft 16 having clutch teeth 20, and the shaft 17 being provided with clutch teeth 21, and either of these clutch members may be brought into engagement with a clutch sleeve 22, that is feathered on a main driving shaft 23, that receives motion from any suitable source of power. The clutch 22 is normally held in engaging position by a spring 24 that is coiled around the driving shaft 23, but may be moved out to release position by means of a lever 25 that is pivoted on a bracket 26 at one side of the frame, and is provided with a pair of pins 27 that enter a groove 28 in the clutching sleeve.

The crank shaft 12 and the disks may be readily turned for the purpose of bringing either of the shafts 16 and 17 into axial alinement with the driving shaft 23, and in order to hold the crank shaft in either of the two positions to which it may be adjusted, the hub 30 of the disk 14 is provided with a pair of diametrically opposed recesses 31, which are arranged to receive a locking pin 32, that is mounted in a guide block 33 secured to the side of the frame. The pin 32 has a recess 34 into which the end of the clutch operating lever 25 extends, and when said lever is thrown upward for the purpose of moving the clutch to release position, the pin 32 is, also, moved out and releases the hub of the disk 14, so that the crank shaft and disks may be readily turned through an angle of 180° to bring the other sprocket carrying shaft into alinement with the driving shaft.

When the clutch pins are moved to release position and the pin is beyond the outer face of the hub 30, the turning of the hub and the movement of either of its recesses beyond the plane of the pin is sufficient to prevent the clutch again moving to coupling position, so that the lever 25 may be released and the end of the pin 32 will remain in engagement with the end of the hub 30, while the disks and crank shaft are being revolved, and then when the second of the openings 31 come into alinement with the pin 32, the spring 24 will operate to force the clutch 22 inward, and at the same time will operate through the lever 25 to force the pin 32 inward, the pin entering the locking recess of the hub and holding the disks from further rotative movement, while the clutch moves into engagement with the clutching teeth of the sprocket carrying shaft then in alinement therewith.

Rigidly secured to one end of the shaft 11 is an operating lever 40 which may be moved between the full and dotted line positions of Fig. 1 in shifting the gears. On the opposite end of shaft 11 is secured a segmental arm 41 that is arranged to engage a semi-circular cam 42 that is revolubly mounted on a pin 43 that projects from the rear end of the clutch operating lever 25. The cam is semicircular in form, and its straight face is normally held in a position perpendicular to the adjacent face of the frame 10, and, therefore, parallel with the axis of the shaft 11 by means of a small torsion spring 44 that surrounds the pin 43 and is secured at one end to the cam, and at the opposite end to a collar 45 at the inner end of the stem.

Extending through guiding openings in the frame is a rod 47 having a projecting flange or collar 48, and between this collar and one of the arms of the frame is a pivotal compression spring 49 that tends to force the outer end of the rod against the clutch operating lever 25, the tendency of the spring being to move the lever to clutch engaging position, and to hold the cam 42 in the path of movement of the segmental arm 41 so that when the shaft 11 is turned by means of the operating lever, the segmental arm will engage said cam 42 and will partly revolve the same, the cam and that end of the lever 25 which carries said cam being forced inward against the resistance offered by the spring 49 and moving the clutch and the pin 32 to release position.

Projecting from the side of the frame is a stud 50, the axis of which is eccentric to the axis of the shaft 11, and on this stud is mounted a grooved disk 51 around which passes a link belt 52, said belt passing around a sprocket pinion 53 that is secured to the crank shaft 12. In order to secure the chain 52 to the disk 51, a locking pin 54 is passed completely through the disk and engages the belt. The periphery of the disk is provided with a notch 55 that is arranged to be engaged by a pin 56 projecting from the operating lever 40 after the latter has completed a portion of its movement, this initial portion of the movement of the lever being sufficient to accomplish the release of the clutch before the pin 56 engages the distant wall of the notch 55. On continuing the movement of the lever, the disk 51 is then rotated and this movement is transmitted through the link belt 52 to the sprocket pinion 53, thereby turning the shaft 12 and the disks and sprocket carrying shafts supported thereby through an arc of 180°. After the movement of the disk is completed, the lever is still carried around a sufficient distance to fully clear the segment 41 from the cam, so that the parts may be in proper position for a reverse movement.

In order to permit the change of position of the parts without shock, a spring 58 is employed, said spring surrounding a rod 59 that is pivoted at one end on a pin 60 projecting from the disk 51, and its opposite bifurcated end is guided in a strap 61 that is secured to one side of the frame. The compression spring 58 bears at one end against the strap, and at the opposite end against a shoulder near the pivoted end of the rod 59.

Motion is transmitted from this mechanism through a belt or sprocket chain 70 that passes around the large and small sprocket wheels carried by the disks 14, 15. When the large sprocket wheel is in active engagement with the chain, the speed of the latter will be much greater than where the smaller sprocket wheel 18 is in engagement with the chain. In changing speed, it is simply necessary to turn the crank shaft in the manner described, so as to move one of the sprocket wheels out of active engagement with the chain and bring the other into active engagement therewith, the shaft of the sprocket wheel that is transmitting movement to the chain being clutched to the driving shaft 23.

In order to check excess movement of the shaft 12 during the adjustment of the gears, a stop pin 71 is employed. This pin projects from the inner face of one of the arms of the frame and is adapted to be engaged by pins 72 projecting from the periphery of the disk 15.

I claim:—

1. In power transmitting mechanism, a power transmitting belt, a plurality of belt wheels, of different diameters arranged to actively engage and impart movement to the said belt, a driving member, and means for adjusting any one of these belt wheels into alinement with and connecting it to said driving member.

2. In power transmitting mechanism, a link belt, a plurality of sprocket wheels lying in the same plane of different diameters arranged to actively engage and impart movement to said belt, a driving member, and means for adjusting any one of the sprocket wheels into alinement with and connecting it to said driving member.

3. In power transmitting mechanism, a link belt, a plurality of sprocket wheels lying in the same plane, a carrier therefor, means for adjusting the carrier to effect meshing of any one of the sprocket wheels with the belt, and a driving member arranged to be coupled to the sprocket wheel in driving position.

4. In power transmitting mechanism, a power shaft, a clutch thereon, an adjustable carrier, a plurality of short shafts carried thereby and each provided with a clutch member, sprocket wheels of different diameters mounted on the short shafts, and means for adjusting the carrier to present any one of the short shafts into alinement with the driving shaft and for automatically engaging the clutching members on the alining shafts.

5. In power transmitting mechanism, a driving shaft, a clutching member thereon, a revolubly adjustable carrier, a plurality of short shafts carried thereby and provided with clutching members, sprocket wheels of different diameters carried by the short shafts, means for turning the carrier to present any one of the short shafts in alinement with the driving shaft, means for connecting the clutching members of the alining shafts, and a link belt arranged to be engaged by the sprocket wheel of the clutched shaft.

6. In power transmitting mechanism, a driving shaft, a clutch member thereon, a pair of revoluble disks, short shafts carried thereby and each provided with a clutching member, the disks being revolubly adjustable to present any shaft in alinement with the driving shaft, means for locking the disks in adjusted position, means for connecting the alining clutching members, sprocket wheels of different diameters carried by the short shafts, and a link belt with which the clutched sprocket wheel intermeshes.

7. In power transmitting mechanism, a driving shaft, a clutching sleeve thereon, a pair of revoluble disks, a plurality of short shafts carried thereby and each provided with a clutching member, there being openings in one disk of a number equal to the number of shafts, sprocket wheels of different diameters carried by the short shafts, a locking pin arranged to enter the openings of the disk, and lock the latter in adjusted position, a lever connected to the clutch sleeve and pin, a cam for actuating said lever, a manually operable shifting lever, and means for connecting the same to the disks to effect rotative movement thereof, and to the cam for effecting movement of the clutch lever to release position.

8. In apparatus of the class described, a driving shaft, a clutch sleeve thereon, a second shaft, a sprocket pinion thereon, a pair of disks carried by said second shaft, a plurality of short shafts mounted on the disks and each provided with a clutching member, sprocket wheels of different diameters mounted on said short shafts, a link belt with which said sprocket wheels are adapted to independently engage, a clutch operating lever engaging the clutch sleeve, a cam carried by said lever, an operating shaft, an arm carried by the operating shaft and arranged to engage said cam, a manually operable lever secured to the operating shaft and provided with a projecting pin, a disk mounted eccentrically of the operating shaft and having a notched periphery with which said pin is arranged to engage, and a sprocket chain extending from the notched disk to the sprocket pinion, substantially as specified.

In testimony that I claim the foregoing as my own, I have hereto affixed my signature in the presence of two witnesses.

MAJOR J. ROBINSON.

Witnesses:
WM. M. COOK,
M. H. WISNER.